3,467,637
LOW MOLECULAR WEIGHT OLEFIN INTER-
POLYMERS PREPARED IN THE PRESENCE OF
BICYCLO[2.2.1]HEPTA-2,5-DIENE
Paul J. Prucnal, Cheswick, Pa., assignor to PPG Industries, Inc., a corporation of Pennsylvania
No Drawing. Filed June 1, 1965, Ser. No. 460,551
Int. Cl. C08f 15/40, 1/42
U.S. Cl. 260—80.78
8 Claims

ABSTRACT OF THE DISCLOSURE

This invention relates to low molecular weight polymers of ethylene and other alpha monoolefins produced by reacting said monomers in the presence of a Ziegler catalyst and small amounts of bicyclo[2.2.1]hepta-2,5-diene. The copolymers are useful inter alia in coatings, adhesives and as tackifying resins.

---

This invention relates to low molecular weight copolymers of ethylene and other monoolefins, and, more particularly, to such copolymers produced in the presence of bicyclo[2.2.1]hepta-2,5-diene.

Copolymers of ethylene and other alpha-olefins are known and are employed in various applications. However, these copolymers as ordinarily produced are of relatively high molecular weight, usually having an intrinsic viscosity of 1.0 or more and a molecular weight of at least 50,000. Heretofore, lower molecular weight copolymers of ethylene and other monoolefins could only be produced using difficult techniques and reaction conditions, and, even using such methods, are obtained in extremely low yield.

The present invention provides an easily practised method of producing copolymers of ethylene and other monoolefins having relatively low molecular weight. These copolymers are useful as adhesives (pressure sensitive and hot bonding), sealing and caulking compounds, tape backings, plasticizers, and coatings, and in similar applications in which the properties associated with their low molecular weight and linear structure make them highly desirable.

The copolymers of the invention have an intrinsic viscosity below those of the known copolymers of this type. For instance, copolymers of ethylene and propylene, as produced herein, usually have an intrinsic viscosity not higher than about 0.8. (Intrinsic viscosity is defined, for example, in the book by Allen entiled "Techniques of Polymer Characterization," Butterworth Publications, Ltd., London, 1959; values as mentioned herein are measured in benzene at 25° C., using an Ubbelohde Dilution Viscometer.) They are produced by copolymerizing ethylene and at least one monoolefin, preferably of the structure $$RCH=CH_2$$

where R is lower alkyl, in a reaction mixture containing inert organic solvent in the presence of from about 0.01 to about 0.04 mole per liter of bicyclo[2.2.1]hepta-2,5-diene (hereinafter called "bicycloheptadiene"). The reaction is carried out using a transition metal catalyst of the Ziegler type.

The process described and the copolymers produced in the above manner have several distinguishing and advantageous characteristics. These include:

(a) The process produces low molecular weight copolymer in good yields using easily practised reaction conditions;

(b) Varying ratios of ethylene to the other monoolefin can be employed, permitting variation in product structure and properties;

(c) The products are essentially linear and homogeneous in structure;

(d) The copolymers are readily dissolved in common organic solvents, this being true even with copolymers containing low proportions (e.g., below 20 percent) of propylene or other comonomer, whereas ordinarily such copolymers are quite crystalline and insoluble; and (e) The copolymers are stable and have good aging characteristics, attributable to their saturated linear backbone.

The preferred comonomer with ethylene is propylene, but other terminal monoolefins such as butylene or isobutylene can also be utilized. The proportion of the comonomer is not critical and can be varied widely; for example, the copolymers can contain from about 5 percent or less to about 99 percent of ethylene and from about 1 percent to 95 percent or more of the other monoolefin or olefins, with the preferred products containing from about 40 to about 95 percent of ethylene. The above percentages are by weight, and are based upon the total monoolefin content of the copolymer.

The concentration of bicycloheptadiene in the reaction mixture is quite important to obtain copolymers of the desired properties. If below about 0.01 mole per liter is employed, the copolymer obtained does not attain the desired low molecular weight and intrinsic viscosity; the presence of about 0.04 mole per liter of bicycloheptadiene provides an interpolymer of modified properties and a relatively high degree of residual unsaturation.

The copolymers obtained are essentially made up of the monoolefins, but a small amount of bicycloheptadiene becomes part of the polymer chains, probably terminating these chains. The exact nature of the copolymer and the details of its structure are not known with certainty, although it is known that the properties of the copolymer are significantly different than those produced in the absence of the bicycloheptadiene. In any event, the amount of diene incorporated in the polymer is not sufficient to provide appreciable amounts of residual unsaturation, as would be found in products which cure at ordinary temperatures in air by an oxidative mechanism.

Various solvents can be employed as the liquid reaction medium for the copolymerization. It is only necessary that the solvent be substantially inert to the reactants and catalysts employed, and to this end moisture and similar reactive contaminants should be excluded. Suitably purified xylene, benzene or similar aromatic hydrocarbon solvent is generally utilized, although aliphatic hydrocarbons, halogenated solvents, and others can also be used.

The reaction is carried out using a transition metal catalyst of the Ziegler type. Ziegler catalysts (sometimes called Ziegler-Natta catalysts) are well known and are of various compositions, but usually involve reaction products of an alkyl aluminum compound and a transition metal compound. A number of such catalysts are described in U.S. Patents 3,131,171; 3,153,023; 3,159,615; 3,168,504; and others. Among the most efficient catalysts for the present polymerizations have been found to be vanadium compounds, and especially vanadium tris(acetylacetonate) or vanadium oxybis(acetylacetonate). Other vanadium compounds that can be used include vanadium tetrachloride and vanadium oxytrichloride.

The concentration of such vanadium compounds in the reaction mixture is important; for example, in the case of the preferred vanadium oxybis(acetylacetonate) and vanadium tris(acetylacetonate) the concentration should be not higher than about 0.002 mole per liter in order to produce the desired products in efficient amounts. The minimum concentration is not critical, since any amount produces some copolymer, but it is generally preferred to have at least about 0.001 millimole of vanadium compound per liter. An alkyl aluminum halide is utilized as the cocatalyst with these vanadium compounds, typical compounds being ethyl aluminum chloride, ethyl aluminum sesquichloride, diethyl aluminum chloride, butyl aluminum sesquichloride and ethyl aluminum sesquiiodide. The amount of alkyl aluminum halide is usually between about 3 moles and about 30 moles per mole of vanadium compound.

With the foregoing exceptions, the reaction conditions are those generally employed in polymerizations of this type. The temperature is ordinarily maintained at room temperature or somewhat below, temperatures as low as −80° C. being suitable. The monoolefins are generally fed to the reaction vessel as the polymerization progresses, and either atmospheric pressure or elevated pressure can be employed.

In a typical procedure for producing these copolymers, the solvent is saturated with ethylene and the other monoolefin or monoolefins in the proportions to achieve the desired copolymer composition, and the bicycloheptadiene is added, followed by the alkyl aluminum compound. The polymerization is commenced by the addition of the vanadium compound or other transition metal compound, and the monomers are added continuously, maintaining saturation of the reaction mixture. If desired, increments of the catalyst components can be added during the polymerization. At the end of the polymerization, the residual catalyst can be removed, if desired, by treatment of the reaction mixture with aqueous hydrochloric acid or other acid and washing with distilled water until acid-free.

The copolymers thus produced can be employed as adhesives for bonding various materials, such as glass, plastics, aluminum, steel and other metals. They can also be utilized as tackifying resin, for instance, as the tackifying component in sealing compounds and natural and synthetic rubber compositions. The copolymers containing 20 percent or more of comonomer with ethylene are particularly useful as tackifiers. The copolymers herein are also useful in formulated compositions and as additives, and for similar purposes.

There are described below several examples of the method in practice of the invention illustrating the manner in which low molecular weight copolymers are produced in accordance therewith. All parts and percentages are by weight unless otherwise specified.

Example 1

A thoroughly clean and dry reaction vessel and fittings were flamed and cooled under a stream of nitrogen. The vessel was then charged with 2 liters of dried benzene and sparged with nitrogen for 15 minutes. Addition was begun of equal volumes of ethylene and propylene at a rate sufficient to maintain saturation of the solution, and 6.34 milliliters of bicycloheptadiene and 3.6 milliliters of a 1.4 molar solution of ethyl aluminum sesquichloride in benzene were added. Cooling with ice water was maintained throughout the polymerization, which was initiated by the addition of 12.5 milliliters of 0.02 molar solution of vanadium oxybis(acetylacetonate) in benzene. The concentration of the vanadium compound was about 0.1 millimole per liter and the concentration of the ethyl aluminum sesquichloride was 2.0 millimoles per liter. Polymerization began immediately, as evidenced by a rise in temperature to 15° C.; reaction conditions were maintained for 7 minutes after the addition of the vanadium compound.

The reaction was terminated by the addition of 25 milliliters of methanol; the reaction mixture was washed with 5 milliliters per liter of concentrated HCl and then washed with 500 milliliter increments of distilled water until acid-free. Benzene was removed by evaporation at reduced pressure, and when most of the benzene had been removed, about 1 liter of aromatic naphtha (Solvesso 100; boiling range 150° C. to 170° C.) was added and stripping was continued until about three-quarters of the Solvesso 100 had been removed, thus also removing residual bicycloheptadiene. The solution remaining had a solids content of 13.9 percent and a Gardner-Holdt viscosity of Z6. The copolymer obtained had an intrinsic viscosity in benzene at 25° C. of 0.62 deciliter/gram.

A corresponding copolymer to that of Example 1, made using the same conditions but without bicycloheptadiene, precipitated during the polymerization and had an intrinsic viscosity of 1.45 dl./g.

Example 2

Example 1 was repeated using 0.01 mole of bicycloheptadiene per liter of reaction mixture. After termination of the reaction with methanol, the solution was poured into a large excess of methanol, thereby precipitating the copoylmer. There were obtained 39 grams of white copolymer, corresponding to a catalyst efficiency of 736 grams of polymer per gram of vanadium oxybis(acetylacetonate).

The products obtained in the foregoing examples have molecular weights substantially lower than copolymers produced in the same manner but without bicycloheptadiene. Products of similar properties are obtained using other monoolefins, such as butylene or isobutylene, in place of propylene, and using different ratios of reactants and varying concentrations of bicycloheptadiene. Also, other catalysts, such as vanadium tris(acetylacetonate), vanadium tetrachloride or vanadium oxytrichloride, can be substituted for the vanadium compound of the examples.

According to the provisions of the patent statutes, there are described above the invention and what are now considered to be its best embodiments. However, within the scope of the appended claims, it is to be understood that the invention can be practiced otherwise than as specifically described.

I claim:

1. A method of producing lower molecular weight copolymers, having an intrinsic viscosity in benzene no higher than about 0.8, containing about 5 percent to about 99 percent of ethylene and about 1 percent to about 95 percent of at least one monoolefin of the structure $$RCH=CH_2$$

where R is lower alkyl, which comprises copolymerizing ethylene and said monoolefin in a reaction mixture containing inert organic solvent, a transition metal alkyl aluminum catalyst mixture of the Ziegler type, said transition metal component being present in a concentration of at least 0.001 millimole per liter, and from about 0.01 to about 0.04 mole per liter of reaction mixture, based upon a saturated solution of the monomers, of bicyclo-[2.2.1]hepta-2,5-diene.

2. The method of claim 1 in which said monoolefin is propylene.

3. The method of claim 1 in which said catalyst comprises vanadium compound selected from the group consisting of vanadium tris(acetylacetonate) and vanadium oxybis(acetylacetonate).

4. The method of claim 3 in which the concentration of said vanadium compound is between about 0.001 millimole and about 0.002 mole per liter of reaction mixture.

5. The product of the process of claim 1.
6. The product of the process of claim 2.
7. The product of the process of claim 3.
8. The product of the process of claim 4.

References Cited

FOREIGN PATENTS 880,904  10/1961  Great Britain.

OTHER REFERENCES

Natta: Polyolefin Elastomers; Rubber & Plastics Age, vol. 46, June 1965, p. 683.

JOSEPH L. SCHOFER, Primary Examiner

ROGER S. BENJAMIN, Assistant Examiner

U.S. Cl. X.R.

260—88.2